(12) United States Patent
Bolan et al.

(10) Patent No.: US 9,083,732 B2
(45) Date of Patent: **\*Jul. 14, 2015**

(54) ESTABLISHING COMMUNICATION BETWEEN ENTITIES IN A SHARED NETWORK

(71) Applicant: Lenovo Enterprise Solutions (Singapore) Pte. Ltd., Singapore (SG)

(72) Inventors: Joseph E. Bolan, Cary, NC (US); Dongming Hwang, Apex, NC (US); Dominic Nguyen, Raleigh, NC (US); Phuong T. Nguyen, Cary, NC (US); Norman C. Strole, Raleigh, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 277 days.

This patent is subject to a terminal disclaimer.

(21) Appl. No.: 13/861,563

(22) Filed: Apr. 12, 2013

(65) Prior Publication Data

US 2014/0310330 A1 Oct. 16, 2014

(51) Int. Cl.
*H04L 29/08* (2006.01)
*H04L 12/00* (2006.01)
*H04L 12/18* (2006.01)
*H04L 29/12* (2006.01)
*H04L 12/413* (2006.01)

(52) U.S. Cl.
CPC .............. *H04L 67/141* (2013.01); *H04L 12/00* (2013.01); *H04L 12/18* (2013.01); *H04L 12/413* (2013.01); *H04L 61/00* (2013.01)

(58) Field of Classification Search
CPC ..... H04L 67/14; H04L 29/06; H04L 67/1046; H04L 67/16

USPC ......... 709/227, 228, 229, 217–219, 201–202, 709/204–206
See application file for complete search history.

(56) References Cited

U.S. PATENT DOCUMENTS

| 6,456,597 B1 | 9/2002 | Bare |
| 8,284,783 B1 | 10/2012 | Maufer et al. |
| 8,291,114 B2 | 10/2012 | Mao et al. |

(Continued)

OTHER PUBLICATIONS

A. Myers et al., "Rethinking the Service Model: Scaling Ethernet to a Million Nodes", Proceedings of Hotnets III, Nov. 2004, pp. 1-6.
P. Knight et al., "Layer 2 and 3 Virtual Private Networks: Taxonomy, Technology, and Standardization Efforts", IEEE Communications Magazine, Jun. 2004, pp. 124-131.
"Service Location Protocol", Wikipedia, Last Modified: Feb. 1, 2013, pp. 1-4, Retrieved Feb. 8, 2013.

(Continued)

*Primary Examiner* — Ruolei Zong
(74) *Attorney, Agent, or Firm* — Law Office of Jim Boice

(57) ABSTRACT

A method, system, and/or computer program product establishes a communication session between two entities on a shared network. A request to locate a desired entity on a shared network, which hosts one or more entities that are unknown to a requesting entity, is received from the requesting entity. A desired environment with which the desired entity is associated is selected by the requesting entity. An inquiry packet is broadcast to all entities on the shared network. The inquiry packet, which does not specify a data link layer by which any particular entity communicates with the shared network, includes a request for an identity of any entity on the shared network that is assigned to the desired environment. A response to the inquiry packet provides an identity and data link layer address of the desired entity, thus enabling the establishment of a communication session between the requesting and desired entities.

20 Claims, 8 Drawing Sheets

(56) References Cited

U.S. PATENT DOCUMENTS

| | | | |
|---|---|---|---|
| 2003/0165140 A1* | 9/2003 | Tang et al. | 370/393 |
| 2004/0203359 A1* | 10/2004 | Sasai et al. | 455/41.1 |
| 2004/0213211 A1 | 10/2004 | Green | |
| 2008/0002705 A1 | 1/2008 | Nishimura | |
| 2009/0113021 A1 | 4/2009 | Andersson et al. | |
| 2011/0075667 A1* | 3/2011 | Li et al. | 370/392 |
| 2012/0014387 A1 | 1/2012 | Dunbar et al. | |
| 2012/0131097 A1 | 5/2012 | Baykal et al. | |
| 2012/0207061 A1 | 8/2012 | Smith et al. | |
| 2013/0044754 A1* | 2/2013 | Zhu | 370/392 |
| 2013/0103765 A1* | 4/2013 | Papakipos et al. | 709/206 |

OTHER PUBLICATIONS

"MAC-Based VLAN Technology White Paper", Hangzhou H3C Technologies Co., Ltd, pp. 1-6, 2009.

"Link Layer Discovery Protocol", Wikipedia, Last Modified: Mar. 12, 2013, pp. 1-3, Retrieved Apr. 12, 2013.

"Address Resolution Protocol", Wikipedia, Last Modified: Jan. 28, 2013, pp. 1-7, Retrieved Feb. 8, 2013.

"IP Multicasting at Layer 2: Module 2", Cisco Systems, Inc., pp. 1-94, 2001, Retrieved Feb. 8, 2013.

E. Guttman et al., "Service Location Protocol, Version 2", Network Working Group, pp. 1-54, Jun. 1999.

* cited by examiner

| | |
|---|---|
| DESTINATION MAC | 00:01:02:03:04:05 |
| SOURCE MAC | 00:AA:BB:CC:DD:EE |
| ETHER TYPE | 0xD1B3 |
| ID | 0x01 |
| GROUP | 0x05 |
| ACTION | 0x02 |
| STATE | 0x02 |
| PRIVATE | 0x00 |
| PAYLOAD LENGTH | 0x20 |
| SEQUENCE IC | 0x01 |
| PAYLOAD 1 | 0A0B A1A2 B1B2 C1C2 D1D2 E1E2 F1F2 F3F4 (HEX) |
| PAYLOAD 2 | 0708 1A2A 1B2B 1C2C 1D2D 1E2E 1F2F 3F4F (HEX) |

ESTABLISHING COMMUNICATION BETWEEN ENTITIES IN A SHARED NETWORK

BACKGROUND

The present disclosure relates to the field of computers, and specifically to the use of computers on a shared network. Still more particularly, the present disclosure relates to establishing communication sessions between entities on a shared network.

In a shared network, such as a Local Area Network (LAN) or private control network, entities often communicate via particular Internet Protocol (IP) addresses. Such IP addresses are dependent upon a particular Media Access Control (MAC) address for a particular device. In other scenarios, communication sessions are established using only the MAC addresses of two devices.

SUMMARY

A method, system, and/or computer program product establishes a communication session between two entities on a shared network. A request to locate a desired entity on a shared network that hosts one or more entities that are unknown to a requesting entity is received from the requesting entity. A desired environment with which the desired entity is associated is selected by the requesting entity. An inquiry packet is broadcast to all entities on the shared network. The inquiry packet, which does not specify a data link layer by which any particular entity communicates with the shared network, includes a request for an identity of any entity on the shared network that is assigned to the desired environment. A response to the inquiry packet provides an identity and data link layer address of the desired entity, thus enabling the establishment of a communication session between the requesting entity and the desired entity.

DETAILED DESCRIPTION

Figure 1:
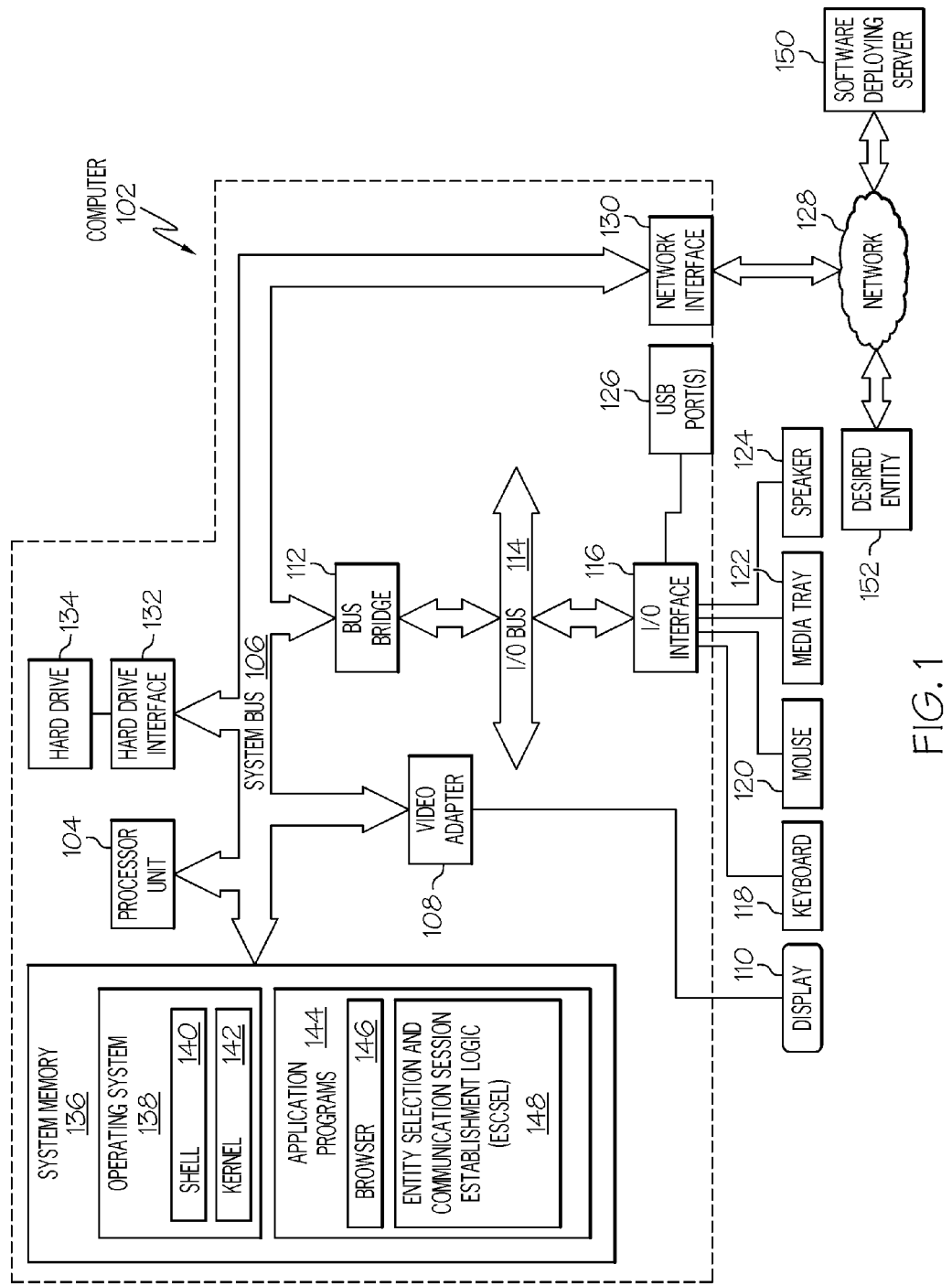
FIG. 1 depicts an exemplary system and network which may be used to implement the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or a desired entity 152.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multimedia interfaces, etc.), a speaker 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150 using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems such as desired entity 152.

Application programs 144 in computer 102's system memory (as well as software deploying server 150's system memory) also include an Entity Selection and Communication Session Establishment Logic (ESCSEL) 148. ESCSEL 148 includes code for implementing the processes described below, including those described in FIGS. 2-9. In one embodiment, computer 102 is able to download ESCSEL 148 from software deploying server 150, including in an on-demand basis, wherein the code in ESCSEL 148 is not downloaded until needed for execution. Note further that, in one embodiment of the present invention, software deploying server 150 performs all of the functions associated with the present invention (including execution of ESCSEL 148), thus freeing computer 102 from having to use its own internal computing resources to execute ESCSEL 148.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

In a shared network, such as a Local Area Network (LAN) or private control network, the present disclosure presents a method/system that enables one entity to learn the Media Access Control (MAC) address of other entities in the same shared network or that share other locality characteristics, such as being physically contained within the same chassis or rack. The MAC address can then be used to establish peer-to-peer communication with each other in the absence of Layer 3 protocols (i.e., protocols described in the Network Layer of the Open Systems Interconnection (OSI) model) or when the MAC address (from a sublayer of the Data Link Layer of the OSI model) can be used as a basis for a Layer 3 address, such as the Link Local Control (LLC) Address (also known as an LLA) used by IPv6 protocols. The present disclosure presents a process for identifying MAC addresses of desired entities, even though a requesting entity does not initially have apriori knowledge or possess any information that includes the MAC address of other entities in the network.

Thus, the present disclosure presents a method that allows an entity to find the MAC address of those entities matching with its criteria (e.g., environment, group, etc., as discussed below) in the shared network. The present method enables the establishment of a communication session between two entities on the shared network using the learned MAC addresses. In one embodiment, the present disclosure verifies a successful Layer 2 communication between the two entities, thus allowing any Layer 3 protocol to proceed.

Figure 2:
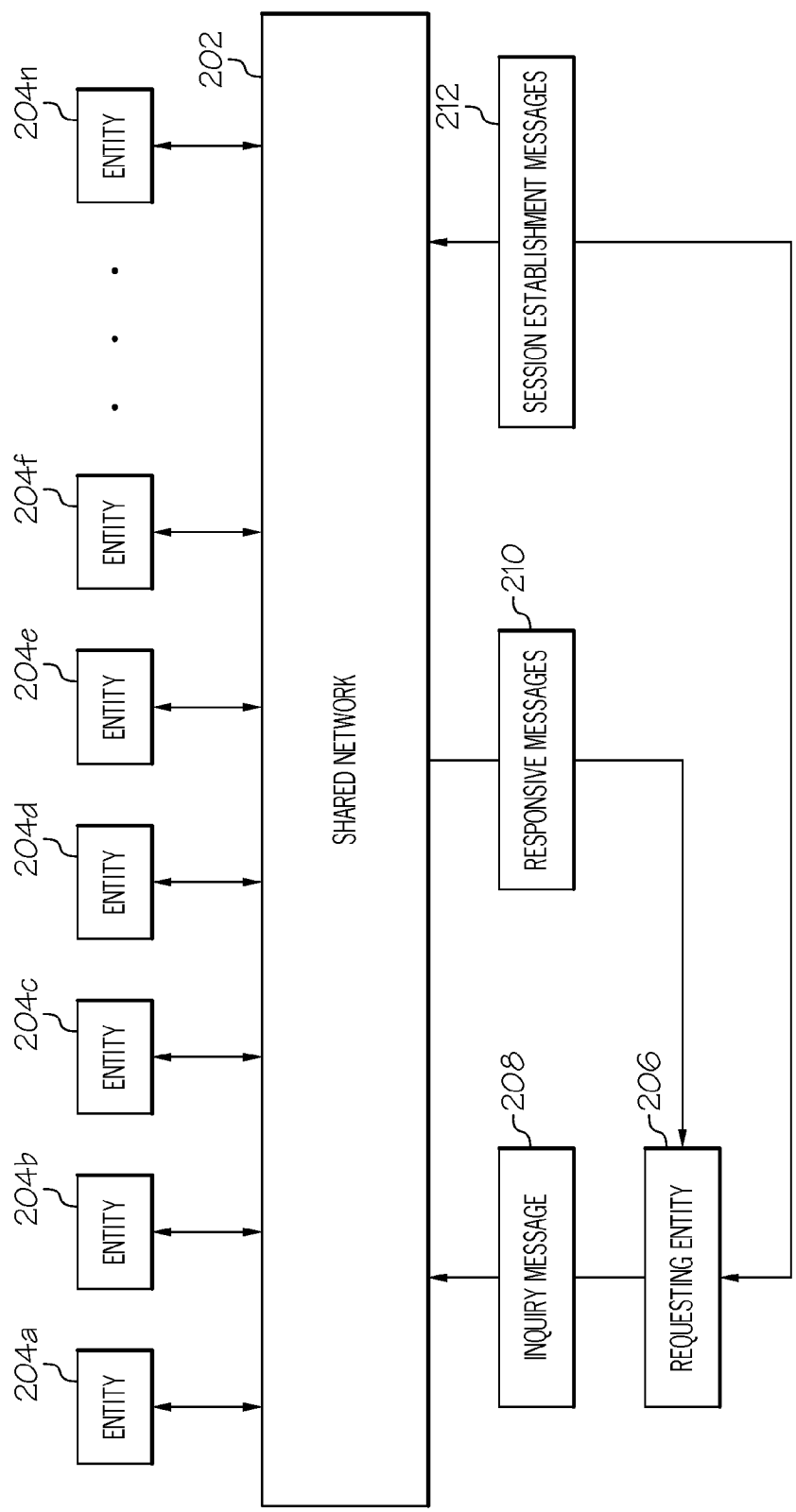
FIG. 2 illustrates an exemplary shared network that hosts multiple entities.

With reference now to FIG. 2, an exemplary shared network 202 that hosts multiple entities 204a-204n (where "n" is an integer) is presented. Entities 204a-204n (e.g., one or more of which may be the desired entity 152 depicted in FIG. 1) are any resources that are capable of coupling to and communicating with other entities, including entities that are logically coupled to shared network 202. Examples of entities 204a-204n include client computers, servers, printers, memories, storage devices, and displays. In order to establish a communication session in which messages are sent back and forth between another entity and one or more of the entities 204a-204n, that other entity needs, at a minimum, the Media Access Layer (MAC) address, also known as the Link Local Control (LLC) address. The MAC/LLC address is a sublayer of the data link layer found in Layer 2 of the OSI model, which is a standardized characterization and standard that describes the functions of a communications system in terms of logical layers, in which each layer provides a foundation for the layer above it in the model. The OSI model includes Layer 1 (the physical layer, which defines electrical and physical specifications for devices); Layer 2 (the data link layer, which describes functional and procedural protocols used to transfer data between network entities, and to detect and correct errors that may occur in the physical layer); Layer 3 (the network layer, which describes the functional and procedural protocols used to transfer data sequences from a source host on one network to a destination host on a different network (in contrast to the data link layer which connects hosts within the same network)); Layer 4 (the transport layer, which describes the protocol used in the transfer of data between end users); Layer 5 (the session layer, which provides protocols for managing connections between local and remote applications); Layer 6 (the presentation layer, which provides the protocol used to establish context and to harmonize syntax and semantics between application-layer entities); and Layer 7 (the application layer, which is software that the user directly interacts with when transmitting messages over a network).

With further reference to FIG. 2, assume that a requesting entity 206 (which in one embodiment is actually one of entities 204a-204n) is being used by a user who wants to establish a communication session with one or more of the entities 204a-204n. More specifically, in one embodiment the user desires to establish a communication session with an entity that is within a particular environment (i.e., has certain properties). However, initially, the user and/or requesting entity 206 do not know the MAC/LLC address of the entity that is desired. Without this MAC/LLC address, the requesting entity 206 (e.g., computer 102 depicted in FIG. 1) is unable to establish such a communication session. As described herein, the present disclosure presents a method that allows requesting entity 206 to find the MAC/LLC address of those entities from entities 204a-204n that match criteria set by requesting entity 206. The process of learning the MAC/LLC address of a desired entity begins with the transmission of an inquiry message 208, described in further detail below. In one embodiment, inquiry message 208 is received by one or more processors, which may be part of one or more of the entities 204a-204n, and/or may be part of a supervisory system, such as computer 102 shown in FIG. 1. Entities from entities 204a-206n that meet the criteria set by the requesting entity 206 return responsive messages 210, which include an identification of the desired entity(ies) MAC/LLC address. Knowledge of these MAC/LLC addresses allows the requesting entity to exchange additional session establishment messages 212. This process thus explicitly verifies a successful Layer 2 communication between the two entities (requesting entity 206 and one or more of the entities 204a-204n), thus allowing any Layer 3 protocol to proceed.

In one embodiment, requesting entity 206 and the desired entity from entities 204a-206n (with which the requesting entity 206 desires to establish a communication session) are a same type of entity. For example, both the requesting entity and the desired entity may both be computers. In one embodiment, however, the requesting entity and the desired entity are different types of entities. For example, the requesting entity may be a computer and the desired entity may be a printer/storage device/display/etc. Similarly, the requesting entity may be a server and the desired entity may be a client computer, or vice versa.

Figure 3:
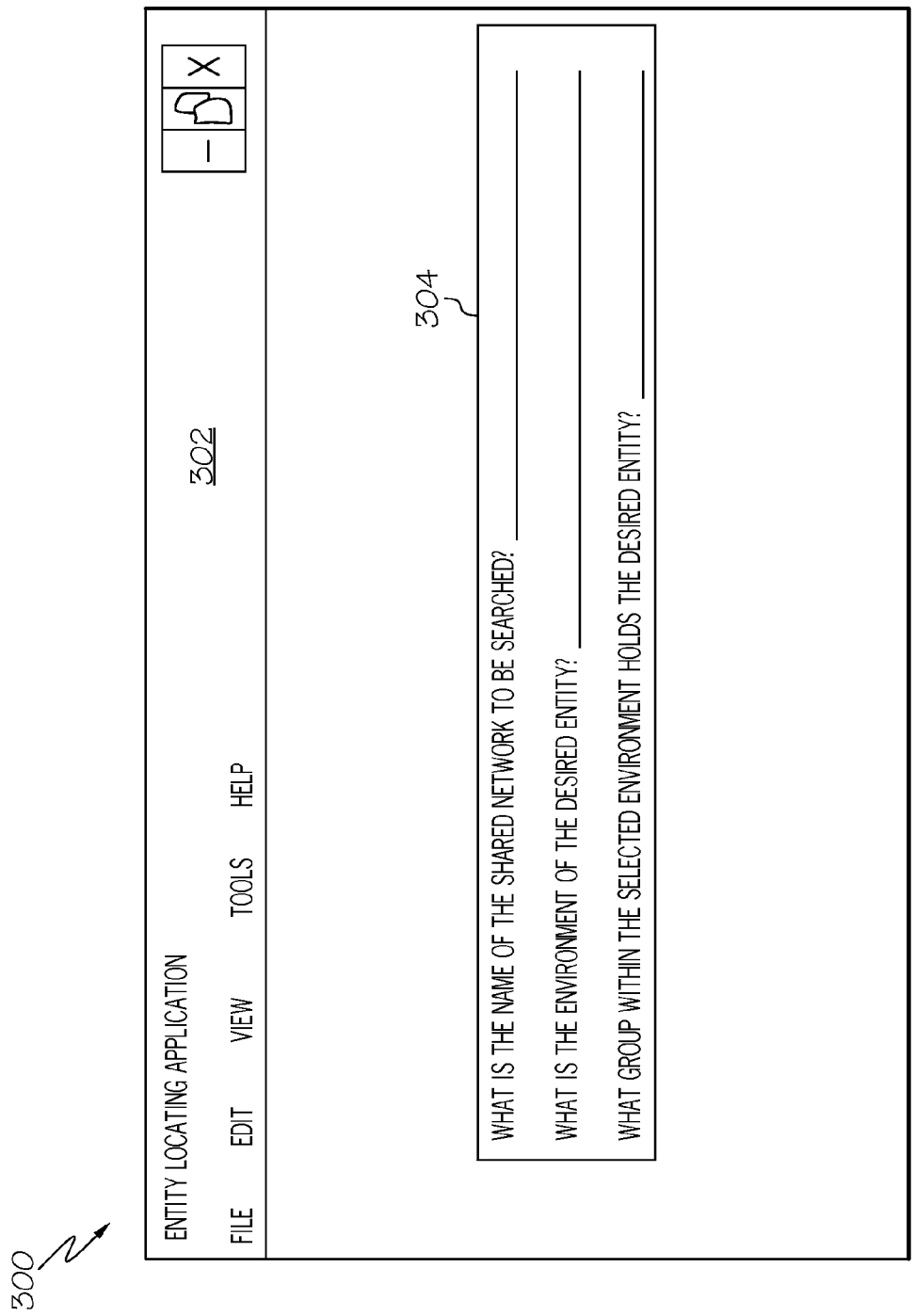
FIG. 3 depicts an exemplary User Interface (UI) that may be used by a user of a requesting entity for locating a desired entity on the shared network depicted in FIG. 2.

With reference now to FIG. 3, an exemplary User Interface (UI) 300 that may be used by a user of a requesting entity (e.g., requesting entity 206 shown in FIG. 2) for locating a desired entity on the shared network 202 depicted in FIG. 2 is presented. UI 300 utilizes an entity locating application 302, which presents a query box 304 to the user. The query box 304 allows the user to specify parameters for the desired entity that he wants to communicate with. As depicted, in one embodiment the user is enabled to identify a particular shared network to be searched. That is, the user can specify that a search only be made of entities that are logically coupled/assigned to a network in a particular location, and/or are owned by a particular enterprise, and/or have a certain bandwidth, etc.

Furthermore, in one embodiment the user is enabled to specify the environment of the desired entity. The environment defines who (e.g., what enterprise) owns the desired entity, what type of hardware system is the desired entity a component of, where (physically or logically) the desired entity is located (e.g., on a cloud of virtual storage devices, within a particular server chassis, in a certain city or building, etc.), when the desired entity went active (i.e., was initially installed, and/or was last activated to come back on-line), and/or how much the desired entity costs (in monetary currency, in bandwidth consumption on the shared network, in time required to access and use the desired entity, etc.).

Furthermore, in one embodiment the user is enabled to specify the group within the selected environment that holds the desired entity. For example, if the environment is an enterprise, then the group could be a commercial division of the enterprise, a particular branch office/location, etc. If the environment is a physical/logical location, the group may be a particular rack within a server chassis. If the environment is a particular date, the group may be a particular hour that the desired entity last came on line and/or was most recently accessed. If the environment is a cost of usage, then the group may be a bandwidth usage during a particular time of day and/or at a particular hub.

Note that one or more, but not all, of the fields in query box 304 can be left blank by the user. A blank field causes the system to resort to a universal search, in which any network/environment/group/etc. is searched.

Figure 4:
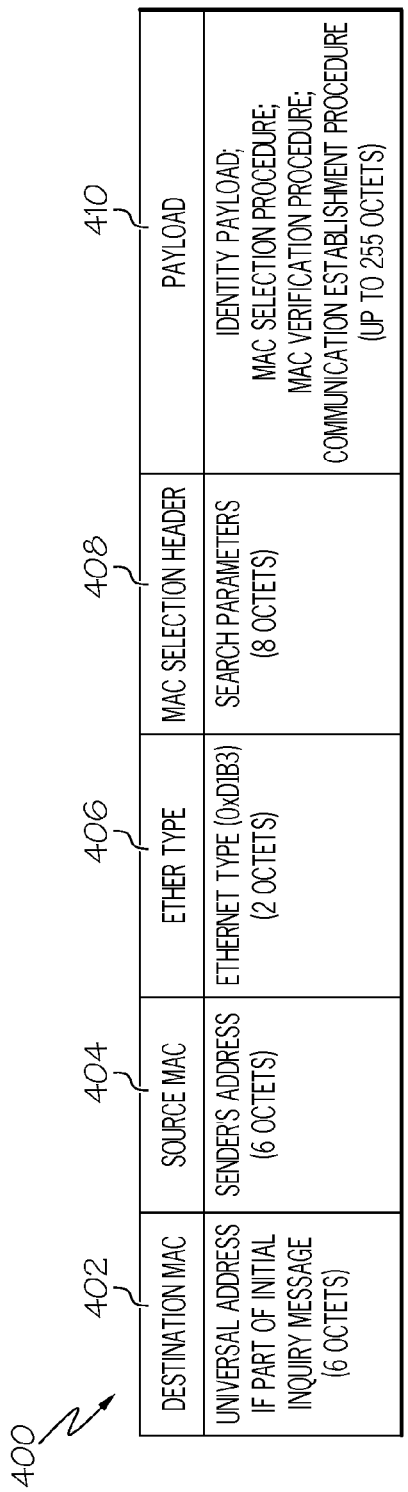
FIG. 4 illustrates headers of an exemplary inquiry packet in accordance with one embodiment of the present disclosure.
Figure 5:
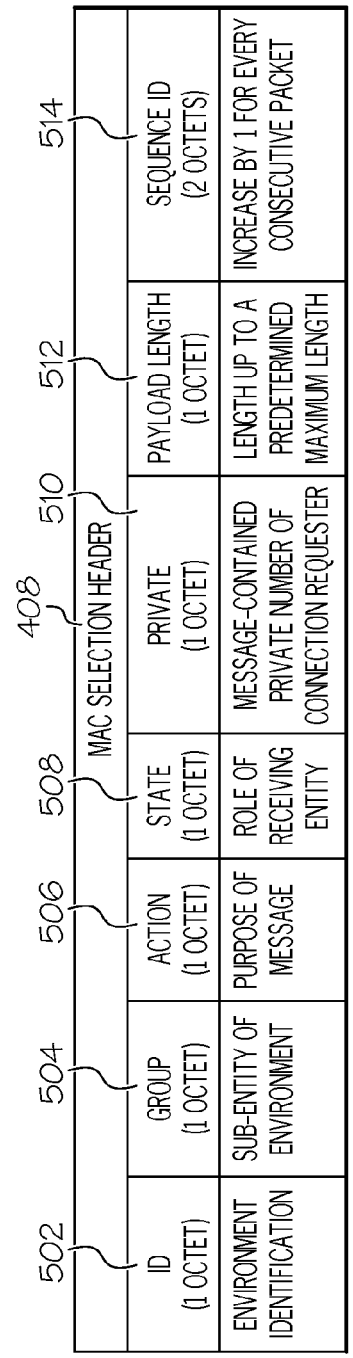
FIG. 5 depicts additional detail of a Media Access Control (MAC) selection header from the inquiry packet depicted in FIG. 4.
Figure 6:
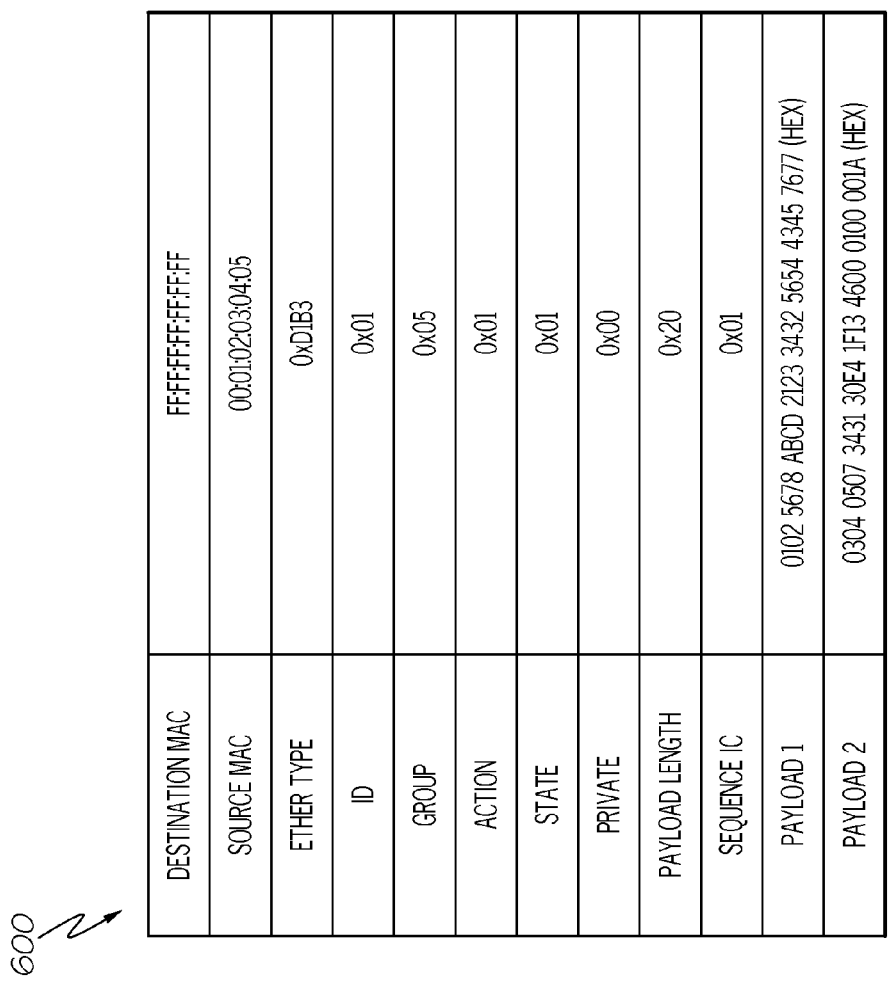
FIG. 6 illustrates details of an exemplary inquiry packet.
Figure 7:
FIG. 7 depicts details of an exemplary response packet, which is responsive to the inquiry packet illustrated in FIG. 6.

With reference now to FIG. 4, headers of an exemplary packet 400, which may be headers in the inquiry message 208, responsive messages 210, and/or session establishment messages 212 depicted in FIG. 2, are presented. Header/field 402 is the destination MAC/LLC address of the packet. When packet 400 is the inquiry message 208 shown in FIG. 2, this field is set to a universal address (i.e., "0"), thus allowing it to be received by all of the entities 204a-204n shown in FIG. 2, whether they turn out to be desired entities (i.e., matching the criteria set by the requesting entity 206) or not.

Field 404 contains the MAC/LLC address of the sender of the packet 400. Ether type field 406 defines what type of network is to be search. In the example shown, the type of network to be search is an Ethernet network, identified as "0xD1B3".

Field 410 contains the payload of the message 400. In one embodiment, this payload is no larger than 255 8-bit bytes (octets).

In one embodiment, the payload includes an identity payload. The purpose of the identity payload is to help identify which entity is associated with a particular MAC address. The identity payload includes a Universally Unique Identifier (UUID) of the entity that owns the MAC/LLC address. The identity payload also includes a UUID of the enclosure (e.g., a blade chassis) in which the entity resides (if applicable). The combination of the two UUIDs provides a correlation of MAC/LLC addresses and entity identities.

In one embodiment, the payload also includes a MAC selection procedure. When an entity (e.g., requesting entity 206 shown in FIG. 2) needs to learn the MAC addresses of other entities, the entity periodically sends out an Announcement packet (depicted as the inquiry message 208 in FIG. 2) until the entity completes its learning process. In one embodiment, the interval between Announcement packets is configurable. In one embodiment, this interval is at least 1 second. For the outgoing Announcement packet 400, the Ethernet header in packet 400 has Ethernet broadcast address (FF:FF:FF:FF:FF:FF) as the destination MAC and its interface MAC address as the source MAC; the Ether Type is set to "0xD1B3" (or other predefined Ether Type for this protocol). In the MAC Selection Header (see FIG. 5), the Action field is set to Announcement (1), and the State field is set according to the receiving entity's role at the time the packet is sent. The Environment ID and Group-ID fields (see FIG. 5) are set according to a specific configuration or a default. For example, the Environment ID and Group-ID fields may indicate the description and/or location of the target entities. This would allow, for example, a chassis or rack control entity to learn the MAC/LLC address of other entities within the same chassis or rack. The Private field (see FIG. 5) carries any value that is only meaningful to a particular environment. The Sequence ID (see FIG. 5) is incremented by 1 for every consecutive packet sent. In one embodiment, the Length field (see FIG. 5) is set to the value of 32, meaning/indicating that the Announcement packet will have a data payload of 32 bytes after the MAC Discover/Selection header. This 32 byte payload is an Identity Payload. The fields in the Identity Payload must be completed if known; otherwise they are set to zeroes.

The payload from field 410 in FIG. 4 also contains the MAC/LLC Verification procedure. If a receiving entity receives an Announcement packet, it must determine whether or not to act on it. When a receiving entity receives an Announcement packet, it can extract the sending entity's MAC address from the Ethernet header source MAC address. The receiving entity can parse the Environment and Group ID fields within the MAC Selection Header and/or the Identity Payload, and then decide to drop or to process the packet. For example, the requesting entity may set a criterion that the receiving entity may not be within the same chassis or rack as the sending/requesting entity. In this example, any receiving entity within the same chassis or rack will, upon receipts of the packet, drop the packet instead of processing it.

Whenever an entity receives an Announcement packet and extracts the Sender's MAC address from the Ethernet Frame header, it parses the MAC Selection Header parameters (i.e. Environment, Group-ID etc.) and decides to either ignore and drop the packet or to respond to the packet. When the entity decides to proceed (respond to the packet), it sends the requesting entity (sender) a unicast packet using the Sender's MAC address with the Action field set to Ask. The Sequence field is then reset to 1. The responsive packet includes the Identity Payload.

Whenever an entity (e.g., the requesting entity) receives an Ask packet from another entity, it responds with an Answer packet. The Sequence field in the Answer packet is increased by one, and the Answer packet includes the same Identity Payload as the received Ask packet.

Continuing with field 410, the payload may also include a communication establishment procedure. After the MAC Verification Procedure, either entity (the requesting entity or the desired entity) can attempt to establish communication using the learned MAC address of each other via any of various local area network (LAN) protocols. For example, either entity can use the EUI-64 format to form the other's MAC address into an IPv6 Link Local Address and start an IPv6 Layer 3 session.

The packet 400 also includes a field 408 for a MAC selection header. This field contains search parameters (i.e., criteria) set by the requesting entity when looking for a particular desired type of entity. Additional detail of field 408 is presented in FIG. 5. Field 502 provides an identification of the environment (e.g., owner, location, etc., as described above) of the entity with which the requesting entity desires to establish a communication session. If this value is set to "0", then all environments are searched. If this value is set to a value between the allocated "1-255", then a particular environment is set as a search criteria. For example "1" may indicate "owned by Enterprise A"; "2" may indicate "owned by Enterprise B"; "3" may indicate "existing on the cloud"; etc. When one of the entities 204a-204n depicted in FIG. 2 receives the packet 400, it drops the packet (i.e., not accept it) if the Environment ID is not zero and/or does not match with its own environment ID. That is, only entities that that are in the specified environment will accept the packet (unless the default universal "0" is set).

Field 504 identifies the group (i.e., sub-entity and/or secondary criteria) specified by the requesting entity. In one embodiment, the definition of the group depends on the ID filed. For example, the group may be a sub-entity of the environment (e.g., the desired environment). In one embodiment, however, the group is not a sub-entity of the environment. Nonetheless, in this embodiment, the entity must be in a particular environment in order to be in a certain group. For example, the group may be a particular group of server chasses. However, for an entity to be located within this group of server chasses, they must run a certain operating system, be owned by any of a group of enterprises, etc. Default "0" is for all groups.

Field 506 describes the action being requested by the packet 400. Examples of such actions include: Announcement (query asking if an entity is "on-line"); Ask (asking an entity to identify its environment and/or its UUID and/or its MAC address); Answer (responding to the Ask message with a description of its environment and/or its UUID and/or its MAC address); etc. In one embodiment, "1" means "Announcement"; "2" means "Ask"; "3" means "Answer"; and 4-254 are reserved for other actions. The entry "255" means that a new control header is being followed, and the length of new control header indicated by the payload length found in field 512.

Field 508 describes the role of the receiving entity and/or the sending/requesting entity. That is, "0" indicates that the entity does not know what its role is. However, "1" indicates that the entity has a primary role, in which it is the designated entity for receiving messages requesting entities having a particular environment identification, are in a particular group, are to respond to particular types of actions (such as "Ask"), etc. Other entities are designated by a "2", indicating that they are in a redundant/secondary role, that they are being held in reserve to take over the role/activities of the primary entity, should the primary entity fail, become overloaded, etc.

Field 510 contains a private number, which the sender (requesting entity) transmits to any receiving entity. The receiving entity includes this private number when sending a message back to the sender. This private number is not secure, but merely is a sender-selected number to identify itself and/or the message.

Field 512 identifies the length of the payload in field 410 shown in FIG. 4. In one embodiment, if the value is zero, then the payload length is undetermined. If this value is greater than zero, it indicates that there is a data payload in the packet with the length indicated.

Field 514 identifies a Sequence ID, which is increased by 1 for every consecutive packet during a communication session packet exchange.

In one embodiment, when an entity E1 (e.g., requesting entity 206 depicted in FIG. 2) tries to find the MAC addresses of peer entities (e.g., one or more of the entities 204a-204n) on the shared network 202 that also share the same Environment and Group-Id as that of the entity E1. That is, in one embodiment, E1 merely specifies which Environment/Group the desired entity(ies) will have. In this embodiment, however, E1 shares the same Environment/Group as the desired entity(ies). In the present example, assume that there is one entity (i.e., desired entity E4) that answers to E1 (i.e., shares the same Environment/Group as that of the requesting entity E1).

First, E1 sends out a broadcast frame (i.e., inquiry packet 600 depicted in FIG. 6) with Ether type "0xD1B3". The broadcast frame specifies that E1 has its Environment field set to 0x01 and Group-Id set to 0x05. E1 only wants to communicate with those target entities that have the same Environment setting and Group-Id. E1's State is set to 0x01 meaning it is a Primary role. In the frame, E1 also includes its Enclosure UUID "0102" in Payload 1 and its own UUID "0304" in Payload 2. (Note that "0xD1B3" is presented as an exemplary Ether/Ethernet Type. That is, in one embodiment any type of network configuration, including different Ether/Ethernet configurations, may be utilized in accordance with the teachings of the present disclosure.)

Figure 8:
FIG. 8 illustrates an exemplary reply packet, which is responsive to the response packet depicted in FIG. 7.

Because packet 600 is a broadcast frame (i.e., is a packet being broadcast to all entities on the shared network), all the entities on the shared network will receive the frame and process it. Only E4 (entity E4) finds that the sender has the same Environment and Group-Id setting, so E4 will send a responsive contact to E1 (entity E1). E4 then sends back a Unicast frame 700 (depicted in FIG. 7) to E1 (MAC=00:01:02:03:04:05) with Action set to Ask ("0x02"), thus initiating the MAC address Verification. Note that E4 sets its State to "0x02", which indicates it is in Redundant role. E1 will receive the unicast packet 700 from E4, which carries the UUID information ("0A0B" and "0708") of E4. E1 will memorize E4's MAC address ("00:AA:BB:CC:DD:EE") and its UUID information. E1 will then send back to E4 an Answer frame 800, as depicted in FIG. 8, thus concluding the MAC Selection procedure. Since both E1 and E4 now have each other's MAC addresses, either one of them can proceed to use other protocols for communication. In this example, assume E1 wants to initiate IPv6 communication to E4 by using LLA (i.e., an LLC address), then E1 will use EUI-64 to format its own MAC and E4 MAC to LLA address as shown below:

E1: MAC: 00:01:02:03:04:05 LLA: fe80::0201:02ff:fe03:0405

E4: MAC: 00:AA:BB:CC:DD:EE LLA: fe80::02aa:bbff:fecc:ddee

Figure 9:
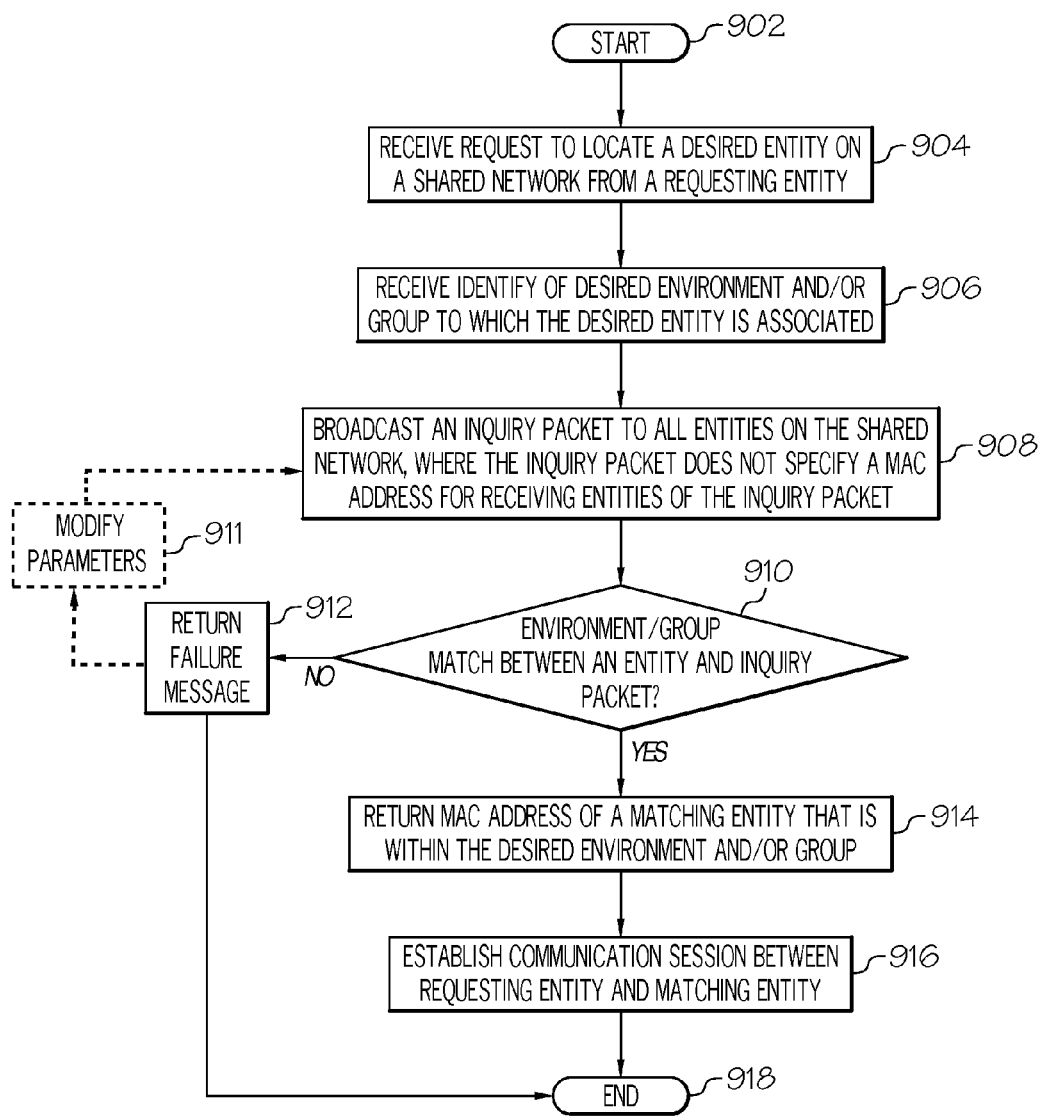
FIG. 9 is a high level flow chart of one or more exemplary steps taken by one or more processors to establish a communication session between two entities on a shared network.

With reference now to FIG. 9, a high level flow chart of one or more exemplary steps taken by one or more processors to establish a communication session between two entities on a shared network is presented. After initiator block 902, a request to locate a desired entity on a shared network is received (block 904). This request is received from a requesting entity that has access to the shared network. As described herein, the shared network hosts one or more entities that are unknown (e.g., their identity, existence, and/or MAC address is unknown) to the requesting entity.

As described in block 906, an identification of a desired environment is then received (e.g., via a UI such as UI 300 shown in FIG. 3). This desired environment is an environment with which the desired entity is associated, and which has been selected and specified by a user of and/or the requesting entity itself (i.e., using resident logic within the requesting entity).

As described in block 908, an inquiry packet is broadcast to all entities on the shared network. As described herein, the inquiry packet does not specify a data link layer (which defines, for example, a Media Access Control (MAC) address) by which any particular entity communicates with the shared network, since the requesting entity does not yet know this information. Thus, the inquiry packet contain a request for an identity of any entity on the shared network that is assigned to (i.e., is within) the desired environment. In one embodiment, the desired environment is a particular enterprise that owns the desired entity. In one embodiment, the desired environment is a particular hardware system of which the desired entity is a component. In one embodiment, the desired environment is a particular cloud on which the desired entity resides. In one embodiment, the desired environment is a particular physical location in which the desired entity resides. In one embodiment, the desired environment is a particular type of network on which the desired entity resides.

As described in query block 910, a query is made to determine whether there is a match between the environment and/or group of the requesting entity (or at least the environment and/or group specified by the requesting entity) and any entity that received the inquiry packet. If there are none, then an error/failure message is returned (block 912) to the requesting entity, informing the requesting entity that there are no matching entities. In one embodiment, the requesting entity can modify the parameters (i.e., environment, group, etc.) being searched to identify particular entities (see alternative block 911). The process ends at terminator block 918.

However, if there is a match in query block 910, then the entity having an environment/group descriptor that matches that of the requesting entity returns its data link layer address (e.g., its MAC address) and/or its UUID to the requesting entity (block 914). This enables either the requesting entity or the identified desired entity to establish a communication session between the requesting entity and the desired entity (block 916), where the communication session utilizes a network layer address for the desired entity, and wherein the network layer address is reliant upon the data link layer address of the desired entity. As described herein, in one embodiment the network layer address is an Internet Protocol (IP) address of the desired entity. In one embodiment, an IP address is not derived, but rather only the MAC address is used to establish a communication session between the requesting entity and the desired entity. That is, an IP address is required to establish a communication session between the requesting entity and the desired entity if a router is used. However, if only a MAC address is used to establish a communication session between the requesting entity and the desired entity (i.e., there is direct communication between the requesting entity and the desired entity without an intermediary router), then no IP address is needed to establish a communication session between the requesting entity and the desired entity.

As described herein, in one embodiment the inquiry packet is populated with an identifier of a desired group, where the desired group is a subdivision of the desired environment, and wherein the inquiry packet further comprises a request for an identity of any entity on the shared network that is assigned to both the desired environment and the desired group. In this embodiment, an identity and data link layer address of the desired entity that is assigned to both the desired environment and the desired group is received. This information enables the establishment of a communication session between the requesting entity and the desired entity that is assigned to both the desired environment and the desired group, where the communication session utilizes a network layer address for the desired entity that is assigned to both the desired environment and the desired group, and where the network layer address is reliant upon the data link layer address of the desired entity that is assigned to both the desired environment and the desired group.

As described herein, in one embodiment the inquiry packet is populated with a private number from the requesting entity, where the requesting entity only accepts responsive packets, from entities on the shared network, that contain the private number.

As described herein, in one embodiment the inquiry packet is populated with an identification of a desired state for the desired entity, where the desired state defines whether a particular entity is a primary entity or a secondary rollover entity for receiving messages for a particular environment. In this embodiment, an identity and data link layer address of the desired entity that is assigned to both the desired environment and the desired state is received. This information enables the establishment of a communication session between the requesting entity and the desired entity that is assigned to both the desired environment and the desired state, where the communication session utilizes a network layer address for the desired entity that is assigned to both the desired environment and the desired state, and where the network layer address is reliant upon the data link layer address of the desired entity that is assigned to both the desired environment and the desired state.

As described herein, in one embodiment the inquiry packet is populated with an identification of a desired state for the desired entity, where the desired state defines whether a particular entity is a primary entity or a secondary rollover entity for receiving messages for a particular group, where the particular group is a subdivision of the desired environment. An identity and data link layer address of the desired entity that is assigned to both the desired environment and the desired state is received. This information enables the establishment of a communication session between the requesting entity and the desired entity that is assigned to both the desired environment and the desired state, where the communication session utilizes a network layer address for the desired entity that is assigned to both the desired environment and the desired state, and where the network layer address is reliant upon the data link layer address of the desired entity that is assigned to both the desired environment and the desired state.

As described herein, in one embodiment the inquiry packet is populated with an identification of a desired state for the desired entity, where the desired state defines whether a particular entity is a primary entity or a secondary rollover entity for receiving messages for a particular action described in the inquiry packet, where the particular action describes a particular action that the requesting entity is directing the desired entity to perform. An identity and data link layer address of the desired entity that is assigned to both the desired environment and the desired state is received. This information enables the establishment of a communication session between the requesting entity and the desired entity that is assigned to both the desired environment and the desired state, where the communication session utilizes a network layer address for the desired entity that is assigned to both the desired environment and the desired state, and where the network layer address is reliant upon the data link layer address of the desired entity that is assigned to both the desired environment and the desired state.

As described herein, in one embodiment the inquiry packet comprises an Ethernet header, a payload, and a Media Access Layer (MAC) selection header, where the Ethernet header comprises a description of a type of Ethernet on which the desired entity resides, where the payload comprises an identify payload that describes a Universally Unique IDentifier (UUID) of an enclosure in which the desired entity is housed, and where the MAC selection header comprises an identification of the desired environment and an identification of a group, where the group is a subdivision of the desired environment.

In various embodiments of the present invention the desired entity is a computer, a storage device, a network interface to a network other than the shared network, and/or a printer.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A computer program product establishing a communication session between two entities on a shared network, the computer program product comprising a non-transitory computer readable storage medium having program code embodied therewith, the program code readable and executable by one or more processors to perform a method comprising:
receiving a request to locate a desired entity on a shared network, wherein the request is received from a requesting entity that has access to the shared network, and wherein the shared network hosts one or more entities that are unknown to the requesting entity;
receiving an identification of a desired environment, wherein the desired environment is an environment with which the desired entity is associated, and wherein the desired environment is selected and specified by the requesting entity;
broadcasting an inquiry packet to all entities on the shared network, wherein the inquiry packet does not specify a data link layer by which any particular entity communicates with the shared network, and wherein the inquiry packet comprises a request for an identity of any entity on the shared network that is assigned to the desired environment;
receiving a response to the inquiry packet, wherein the response is a responsive packet that provides an identity and data link layer address of the desired entity; and
establishing a communication session between the requesting entity and the desired entity, wherein the communication session utilizes a network layer address for the desired entity, and wherein the network layer address is reliant upon the data link layer address of the desired entity.

2. The computer program product of claim 1, wherein the desired environment is a particular enterprise that owns the desired entity.

3. The computer program product of claim 1, wherein the desired environment is a particular hardware system of which the desired entity is a component.

4. The computer program product of claim 1, wherein the data link layer defines a Media Access Control (MAC) address of the desired entity.

5. The computer program product of claim 1, wherein the computer program product further comprises program code that is readable and executable by one or more processors for:
populating the inquiry packet with an identifier of a desired group, wherein the desired group is a subdivision of the desired environment, and wherein the inquiry packet further comprises a request for an identity of any entity on the shared network that is assigned to both the desired environment and the desired group;
receiving an identity and data link layer address of the desired entity that is assigned to both the desired environment and the desired group; and
establishing a communication session between the requesting entity and the desired entity that is assigned to both the desired environment and the desired group, wherein the communication session utilizes a network layer address for the desired entity that is assigned to both the desired environment and the desired group, and wherein the network layer address is reliant upon the data link layer address of the desired entity that is assigned to both the desired environment and the desired group.

6. The computer program product of claim 1, further comprising program code that is readable and executable by one or more processors for:
populating the inquiry packet with a private number from the requesting entity, wherein the requesting entity only accepts responsive packets, from entities on the shared network, that contain the private number.

7. The computer program product of claim 1, wherein the computer program product further comprises program code that is readable and executable by one or more processors for:
populating the inquiry packet with an identification of a desired state for the desired entity, wherein the desired state defines whether a particular entity is a primary entity or a secondary rollover entity for receiving messages for a particular environment;
receiving an identity and data link layer address of the desired entity that is assigned to both the desired environment and the desired state; and
establishing a communication session between the requesting entity and the desired entity that is assigned to both the desired environment and the desired state, wherein the communication session utilizes a network layer address for the desired entity that is assigned to both the desired environment and the desired state, and wherein the network layer address is reliant upon the data link layer address of the desired entity that is assigned to both the desired environment and the desired state.

8. The computer program product of claim 1, wherein the computer program product further comprises program code that is readable and executable by one or more processors for:
  populating the inquiry packet with an identification of a desired state for the desired entity, wherein the desired state defines whether a particular entity is a primary entity or a secondary rollover entity for receiving messages for a particular group, wherein the particular group is a subdivision of the desired environment;
  receiving an identity and data link layer address of the desired entity that is assigned to both the desired environment and the desired state; and
  establishing a communication session between the requesting entity and the desired entity that is assigned to both the desired environment and the desired state, wherein the communication session utilizes a network layer address for the desired entity that is assigned to both the desired environment and the desired state, and wherein the network layer address is reliant upon the data link layer address of the desired entity that is assigned to both the desired environment and the desired state.

9. The computer program product of claim 1, wherein the computer program product further comprises program code that is readable and executable by one or more processors for:
  populating the inquiry packet with an identification of a desired state for the desired entity, wherein the desired state defines whether a particular entity is a primary entity or a secondary rollover entity for receiving messages for a particular action described in the inquiry packet, wherein the particular action describes an action that the requesting entity is directing the desired entity to perform;
  receiving an identity and data link layer address of the desired entity that is assigned to both the desired environment and the desired state; and
  establishing a communication session between the requesting entity and the desired entity that is assigned to both the desired environment and the desired state, wherein the communication session utilizes a network layer address for the desired entity that is assigned to both the desired environment and the desired state, and wherein the network layer address is reliant upon the data link layer address of the desired entity that is assigned to both the desired environment and the desired state.

10. The computer program product of claim 1, wherein the inquiry packet comprises an Ethernet header, a payload, and a Media Access Control (MAC) selection header, wherein the Ethernet header comprises a description of a type of Ethernet on which the desired entity resides, wherein the payload comprises an identify payload that describes a Universally Unique IDentifier (UUID) of an enclosure in which the desired entity is housed, and wherein the MAC selection header comprises an identification of the desired environment and an identification of a group, wherein the group is a subdivision of the desired environment.

11. A computer system comprising:
  a processor, a computer readable memory, and a computer readable storage medium;
  first program instructions to receive a request to locate a desired entity on a shared network, wherein the request is received from a requesting entity that has access to the shared network, and wherein the shared network hosts one or more entities that are unknown to the requesting entity;
  second program instructions to receive an identification of a desired environment, wherein the desired environment is an environment with which the desired entity is associated, and wherein the desired environment is selected and specified by the requesting entity;
  third program instructions to broadcast an inquiry packet to all entities on the shared network, wherein the inquiry packet does not specify a data link layer by which any particular entity communicates with the shared network, and wherein the inquiry packet comprises a request for an identity of any entity on the shared network that is assigned to the desired environment;
  fourth program instructions to receive a response to the inquiry packet, wherein the response is a responsive packet that provides an identity and data link layer address of the desired entity; and
  fifth program instructions to establish a communication session between the requesting entity and the desired entity, wherein the communication session utilizes a network layer address for the desired entity, and wherein the network layer address is reliant upon the data link layer address of the desired entity; and wherein
the first, second, third, fourth, and fifth program instructions are stored on the computer readable storage medium for execution by the processor via the computer readable memory.

12. The computer system of claim 11, wherein the desired environment is a particular enterprise that owns the desired entity.

13. The computer system of claim 11, wherein the desired environment is a particular hardware system of which the desired entity is a component.

14. The computer system of claim 11, wherein the data link layer defines a media access control (MAC) address of the desired entity.

15. The computer system of claim 11, further comprising:
  sixth program instructions to populate the inquiry packet with an identifier of a desired group, wherein the desired group is a subdivision of the desired environment, and wherein the inquiry packet further comprises a request for an identity of any entity on the shared network that is assigned to both the desired environment and the desired group;
  seventh program instructions to receive an identity and data link layer address of the desired entity that is assigned to both the desired environment and the desired group; and
  eighth program instructions to establish a communication session between the requesting entity and the desired entity that is assigned to both the desired environment and the desired group, wherein the communication session utilizes a network layer address for the desired entity that is assigned to both the desired environment and the desired group, and wherein the network layer address is reliant upon the data link layer address of the desired entity that is assigned to both the desired environment and the desired group; and wherein
the sixth, seventh, and eighth program instructions are stored on the computer readable storage medium for execution by the processor via the computer readable memory.

16. The computer system of claim 11, further comprising:
  sixth program instructions to populate the inquiry packet with a private number from the requesting entity, wherein the requesting entity only accepts responsive packets, from entities on the shared network, that contain the private number; and wherein the sixth program instructions are stored on the computer readable storage medium for execution by the processor via the computer readable memory.

17. The computer system of claim 11, further comprising:
sixth program instructions to populate the inquiry packet with an identification of a desired state for the desired entity, wherein the desired state defines whether a particular entity is a primary entity or a secondary rollover entity for receiving messages for a particular environment;
seventh program instructions to receive an identity and data link layer address of the desired entity that is assigned to both the desired environment and the desired state; and
eighth program instructions to establish a communication session between the requesting entity and the desired entity that is assigned to both the desired environment and the desired state by using the data link layer address, wherein the communication session is established directly between the requesting entity and the desired entity without use of a router; and wherein
the sixth, seventh, and eighth program instructions are stored on the computer readable storage medium for execution by the processor via the computer readable memory.

18. The computer system of claim 11, further comprising:
sixth program instructions to populate the inquiry packet with an identification of a desired state for the desired entity, wherein the desired state defines whether a particular entity is a primary entity or a secondary rollover entity for receiving messages for a particular group, wherein the particular group is a subdivision of the desired environment;
seventh program instructions to receive an identity and data link layer address of the desired entity that is assigned to both the desired environment and the desired state; and
eighth program instructions to establish a communication session between the requesting entity and the desired entity that is assigned to both the desired environment and the desired state, wherein the communication session utilizes a network layer address for the desired entity that is assigned to both the desired environment and the desired state, and wherein the network layer address is reliant upon the data link layer address of the desired entity that is assigned to both the desired environment and the desired state; and wherein
the sixth, seventh, and eighth program instructions are stored on the computer readable storage medium for execution by the processor via the computer readable memory.

19. The computer system of claim 11, further comprising:
sixth program instructions to populate the inquiry packet with an identification of a desired state for the desired entity, wherein the desired state defines whether a particular entity is a primary entity or a secondary rollover entity for receiving messages for a particular action described in the inquiry packet, wherein the particular action describes an action that the requesting entity is directing the desired entity to perform;
seventh program instructions to receive an identity and data link layer address of the desired entity that is assigned to both the desired environment and the desired state; and
eighth program instructions to establish a communication session between the requesting entity and the desired entity that is assigned to both the desired environment and the desired state, wherein the communication session utilizes a network layer address for the desired entity that is assigned to both the desired environment and the desired state, and wherein the network layer address is reliant upon the data link layer address of the desired entity that is assigned to both the desired environment and the desired state; and wherein
the sixth, seventh, and eighth program instructions are stored on the computer readable storage medium for execution by the processor via the computer readable memory.

20. The computer system of claim 11, wherein the inquiry packet comprises an Ethernet header, a payload, and a Media Access Control (MAC) selection header, wherein the Ethernet header comprises a description of a type of Ethernet on which the desired entity resides, wherein the payload comprises an identify payload that describes a Universally Unique IDentifier (UUID) of an enclosure in which the desired entity is housed, and wherein the MAC selection header comprises an identification of the desired environment and an identification of a group, wherein the group is a subdivision of the desired environment.

* * * * *